United States Patent [19]

Wu

[11] Patent Number: 4,659,811

[45] Date of Patent: Apr. 21, 1987

[54] ALKALINE REFINED GUM AND USE THEREOF IN IMPROVED WELL-TREATING COMPOSITIONS

[75] Inventor: Shang-Ren Wu, St. Anthony, Minn.

[73] Assignee: Henkel Corporation, Minneapolis, Minn.

[21] Appl. No.: 614,588

[22] Filed: May 29, 1984

[51] Int. Cl.$^4$ ............................................. C08B 37/00
[52] U.S. Cl. ................................. 536/114; 536/120; 252/8.551
[58] Field of Search .......................................... 536/114

[56] References Cited

U.S. PATENT DOCUMENTS

| | | | |
|---|---|---|---|
| 3,455,899 | 7/1969 | Keen | 536/114 |
| 3,729,460 | 4/1973 | Patton | 536/114 |
| 3,808,195 | 4/1974 | Shelso et al. | 536/114 |
| 3,912,715 | 10/1975 | Jarowenko | 536/114 |
| 4,169,798 | 10/1979 | DeMartino | 536/114 |
| 4,169,945 | 10/1979 | DeGuia et al. | 536/114 |
| 4,257,903 | 3/1981 | Kucera et al. | 536/114 |
| 4,429,121 | 1/1984 | Sandford | 536/114 |

FOREIGN PATENT DOCUMENTS

| | | | |
|---|---|---|---|
| 120601 | 7/1983 | Japan | 536/114 |
| 906327 | 9/1962 | United Kingdom | 536/114 |

OTHER PUBLICATIONS

Derwent Abstract No. J59164-301-A, Dec. 12, 1984.

*Primary Examiner*—Johnnie R. Brown
*Attorney, Agent, or Firm*—Ernest G. Szoke; Patrick J. Span; John Daniel Wood

[57] ABSTRACT

A process for the alkaline refining of gum splits is provided. Also provided are hydraulic fluid fracturing compositions which contain alkaline refined gum and which exhibit superior solution viscosity and low residue after break. Also provided is a method of hydraulic fluid fracturing of the subterranean formations surrounding a well using such compositions.

14 Claims, No Drawings

ALKALINE REFINED GUM AND USE THEREOF IN IMPROVED WELL-TREATING COMPOSITIONS

FIELD OF THE INVENTION

This invention relates to a novel process for refining gum splits and to novel hydraulic fluid compositions for fracturing the subterranean formations associated with oil and gas producing wells. More particularly, this invention relates to a novel process of refining gum splits to improve the viscosity and residue after break of the resulting gum and to fracturing fluids which contain the alkaline refined gum as a gelling agent, a process for preparing such hydraulic fluids, and a method of using such fluids.

BACKGROUND OF THE INVENTION

U.S. Pat. No. 4,169,798 to DeMartino discusses the use of hydraulic fracturing fluid compositions to increase the productivity of oil and gas wells. The patentee notes that such hydraulic fracturing fluids commonly employ a viscosity increasing agent such as a water soluble polymer to improve the flow characteristics and the suspending ability of the fluids. The patentee provides hydraulic fracturing fluids which contain methylated derivatives of polygalactomannan gums as a gelling agent. These polygalactomannan derivatives are obtained by treating a natural gum, such as guar gum, with a methylating agent in the presence of a strongly alkaline compound in an amount sufficient to neutralize the strong acid which is generated in situ during the course of the methylation. The patentee states that the use of the natural gum derivatives results in improved viscosity and suspending properties of the hydraulic fracturing fluid compositions as well as a low yield of hydrolysis residue upon the subsequent hydrolysis of the polygalactomannan derivatives.

British Pat. No. 906,327 discloses that crushed guar seeds, wherein the seed is split but portions of the husk and embryo remain firmly adhered to the endosperm sections, can be treated with aqueous alkali at a temperature in the range of 60° to 120° C. to loosen the husks and embryos from the endosperm sections. The endosperm "splits" are obtained separate from the remaining husks and embryos of the seeds by centrifugation. The patentee does not disclose the use of an inert atmosphere nor does he discuss the viscosity of the galactomannan obtained thereby.

It is an object of the present invention to provide an improved process of refining gum splits by treatment with an aqueous alkaline solution.

It is an object of the present invention to provide hydraulic fracturing fluid compositions which contain alkali refined gum and which have high viscosity and low hydrolysis residue.

It is also an object of the present invention to provide a method of using such hydraulic fracturing fluid compositions.

SUMMARY OF THE INVENTION

This invention provides a process for refining gum splits which comprises:

treating 100 parts by weight of gum splits with at least about 150 parts by weight of an aqueous solution containing an amount of a basic material sufficient to raise the pH of the aqueous solution to at least about 12, in an inert atmosphere and at a temperature of from about room temperature to about 110° C., for a period of at least about ¼ hour.

This invention also provides novel hydraulic fracturing fluid compositions comprising:

(1) an aqueous medium,
(2) alkali refined gum as a gelling agent, and
(3) a breaker additive for subsequent reduction of fluid viscosity.

It has been found that the alkaline refining of the gum splits increases the viscosity of the gum so obtained by from about 20% to about 50%. It has also been found that the above procedure removes from the gum splits from about 70% to about 95% of the protein contained therein; this lowers the hydrolysis residue of the gum from about 6-12% down to about 2-4%. It has been found that the use of such an alkaline refined gum results in hydraulic fracturing fluids of superior fluid viscosity and a low yield of hydrolysis residue.

DETAILED DESCRIPTION OF THE INVENTION

Gum splits, as defined herein, means the endosperm sections of the seeds of a leguminous plant which contain polygalactomannans. Examples of these seeds include guar seeds and locust beans.

The preferred endosperm sections are guar splits. These are the tough non-brittle endosperm sections of the seed of a leguminous plant such as Cyamopsis tetragonoloba. Guar seeds are composed of a pair of tough, non-brittle endosperm sections, hereinafter referred to as "guar splits", between which is sandwiched the brittle embryo (germ). The entire structure is enclosed in a tough seed coat (hull). The seeds are split by heating them and subjecting them to mechanical impact forces. The hull and embryo, which adhere to the splits, can be separated therefrom by further physical processing.

The alkaline refining of gum splits according to the present invention is begun by treating the splits with an aqueous solution having a pH of at least about 12. Generally, about 100 parts by weight of the gum splits are mixed with at least about 150 parts by weight of an aqueous solution containing an amount of a basic material sufficient to raise the pH of the aqueous solution to at least about 12. Examples of suitable basic materials include the alkali and alkaline earth metal hydroxides, e.g., sodium hydroxide, potassium hydroxide, calcium hydroxide, magnesium hydroxide, etc. The preferred aqueous solution is a sodium hydroxide solution containing from about 0.8% to about 40% sodium hydroxide in water. The aqueous solution has preferably been deaerated to remove dissolved oxygen. Such deareation is preferably accomplished by boiling the solution at reduced pressure. Preferably the concentration of sodium hydroxide is between about 2% and about 5%. Preferably, about 185-600 parts by weight and, more preferably, about 550 parts by weight of this aqueous alkali solution is used per 100 parts of the gum splits.

The amount of aqueous alkaline solution used should be sufficient to maintain at least about 60% by weight water in the reaction mixture. When the amount of water in the reaction mixture is less than about 60% by weight of the reaction mixture, i.e., the combined weights of alkaline solution and gum splits, the rate of hydration of the resulting gum is retarded, the viscosity of the resulting gum is lower, and the hydrolysis residue after break is increased as compared to the alkali refined gums of this invention.

When less than about 230 parts by weight of aqueous alkaline solution is used per 100 parts of gum splits, the splits will imbibe substantially all of the added liquid if kept above about 80° C. This process variation is referred to as a semi-dry process.

When more than about 230 parts of aqueous alkaline solution is used per 100 parts of gum splits, the reaction mixture will be a slurry wherein the gum splits are suspended in the excess liquid. This process variation is referred to as a slurry process.

In the slurry process of this invention, a crosslinking salt is added to the reaction mixture to prevent hydration of the gum. The use of a crosslinking salt is not required in the semi-dry process, but is preferred.

Crosslinking salts are salts which form a complex with the polygalactomannan chains in the presence of alkali to crosslink the polygalactomannan chains and thereby render the polygalactomannan essentially insoluble in an aqueous alkali solution. Examples of such complexing salts are ferric chloride, copper sulfate, copper acetate, lead acetate, aluminum levulinate, aluminum lactate, barium chloride, calcium chloride, sodium silicate, and borax. The preferred complexing salt is borax and the preferred amount of borax ranges from 0.1 to 0.5 parts by weight, most preferably 0.25 parts by weight based on the weight of 100 parts gum splits.

The mixture of the gum splits and aqueous alkaline solution is kept under an inert atmosphere at a temperature of from about room temperature, i.e., about 25° C., to about 110° C. for a period of from at least about ¼ hour. More preferably, the mixture is allowed to react at a temperature of at least 60° C. for at least about ½ hour; most preferably from about 70° C. to about 90° C. for about 1–2 hours. The inert atmosphere is composed of any inert gas that will not oxidize or otherwise react with the components of the reaction mixture. Nitrogen and argon are examples of suitable inert gases.

During the reaction time, the gum splits absorb part or all of the aqueous alkaline solution and become brittle. The treated gum splits are then cooled to room temperature and subjected to further routine processing to collect the gum. Any excess liquid is removed from the reaction mixture by centrifugation, filtration, or other means and washed with water. The residual alkalinity of the wet solids can be partially neutralized by the addition of an acid such as acetic acid to reduce the pH to below about 11. The resulting washed solids can be milled and dried to yield the alkaline refined gum. In the alternative, the gum splits can be subjected to further derivatization, such as methylation, hydroxyalkylations, etc. before beginning the routine processing to collect the gum.

The hydraulic fracturing fluid of the present invention is obtained by mixing the alkaline refined gum with water and a breaker additive.

The breaker additive is preferably an enzyme which, under formation fracturing conditions, autonomously degrades the alkali refined gum gelling agent so as to reduce the viscosity of the hydraulic fluid which is under hydrostatic pressure. Although the effect of the enzyme breaker additive commences immediately upon intimate admixture of the alkali refined gum and the breaker additive, the time required to reduce solution viscosity by 50% can range over a period of about ½ hour to about 2 hours. The rate of alkaline refined gum degradation is effected by pH, temperature, and salt content of the hydraulic fluid system. The enzyme breaker additive can be employed in a quantity between about 0.1 and about 5% by weight based upon the weight of the alkaline refined gum in the hydraulic fluid composition.

Another type of breaker additive compound which can be employed are those which provide an acidic pH to the hydraulic fracturing fluid composition. Such breaker additives include inorganic and organic acids and compounds such as esters which convert to acidic derivatives under well-treating conditions. Illustrative of suitable breaker additives of this type are sulfuric acid, hydrochloric acid, p-toluenesulfonic acid, acetic acid, triethyl phosphate, methyl formate, ethyl propionate, butyl lactate, and the like. This type of breaker additive can be employed in a quantity of between about 0.5 and about 20% by weight based on the weight of the alkali refined gum in the hydraulic fluid composition.

Another type of breaker additive compounds which can be employed are oxidizing agents. Illustrative of suitable breaker additives of this type are ammonium persulfate, potassium dichromate, potassium permanganate, peracetic acid, t-butyl hydroperoxide, and the like. This class of breaker additive can be employed in the quantity between about 0.5 and 20% by weight based on the weight of the alkaline refined gum in the hydraulic fluid composition.

The quantity of alkaline refined gum incorporated in the compositions of the present invention can vary in the range of between about 0.05 and about 5% by weight based upon the weight of the water component. A preferred range is between about 0.1 and 2% by weight of the alkaline refined gum based on the weight of the water.

The hydraulic fracturing method of the present invention is accomplished by rapidly injecting the hydraulic fracturing fluid compositions of the present invention into an area where fracturing is desired. The rapid injection of this fluid creates a hydrostatic pressure which energizes splitting forces in the combined zones of the subterranean formation. Pressures as high as 10,000 psi are employed to effect formation fracturing.

The hydraulic fracturing fluid compositions of the present invention also preferably employ a propping agent which is suspended in the high viscosity hydraulic fracturing fluid. These propping agents penetrate the newly created fissures in the subterranean formations associated with oil and gas wells and become lodged therein. The function of the propping agent is to support the fractures in an open position as a conduit for the flow of fluids such as oil, gas or water through the fractured zone. Various non-compressable materials are employed as propping agents. These include sand, rounded walnut shells, glass beads, aluminum spheres, and the like.

After a fracturing operation has been completed and the propping agent has been deposited, the hydrostatic pressure is released, the flow of fluid is reversed, and the hydraulic fracturing fluid is withdrawn.

EXAMPLES

The following examples illustrate the alkaline refining of gum splits to obtain the alkaline refined gum useful in the well-fracturing compositions of the present invention.

Viscosity and Residue After Break

The viscosity of solutions of the gums from the following examples were determined at varying intervals after addition to water as shown in the following tables. The viscosity of a buffered potassium chloride solution of the dried samples was determined using a Fann Model 35G Viscometer, equipped with 0.2 spring at two different rpm levels. The solution contained 0.42%, moisture-free basis, of guar of mesh −200/+325. The potassium chloride was present in a 2% concentration with monosodium phosphate (0.168 g/L) as a buffer.

The residue after break (% RAB) was determined for each sample by breaking a preweighed sample as follows.

A preweighed sample of known moisture content of approximately 0.5 grams (g) was added to 100 milliliters (ml) of stirred water. To this slurry was added 2 drops of an 80% formic acid solution. The resulting mixture was stirred for one hour at room temperature. A 0.5 g sample of potassium persulfate ($K_2S_2O_8$) was then added to the solution and the resulting solution was placed in an 80° C. water bath for approximately 48 hours (hrs).

The "broken" solution was then passed through a 1 micron pore-size filter under 40 psi nitrogen. The residue was dried and weighed to determine the residue after break. The percent nitrogen (% N) of the samples was also determined.

EXAMPLE I

The reactions were run under nitrogen in a 1 liter (L) pear-shaped flask with four flared indentations for aiding agitation of the mixture. The flask was connected to a rotary evaporator for tumbling. For each run, guar splits, 80 g (8.6% moisture), were first tempered with the deaerated alkaline borax solution, which was prepared by dissolving 8 g NaOH and 0.2 g borax in 387 g deaerated water, at room temperature for 5 minutes (min). The mixture was then thermally treated with an oil bath preheated to 90° C. A series of reactions were run with different time intervals ranging from 0.25 to 4 hrs. After treatment the excess liquid phase was separated by centrifugation and the reacted splits were washed with 1 L 20° C. water for 30 min., meanwhile the solution was neutralized to pH 9.5 with acetic acid. After centrifugation the splits were milled and air dried to give the final product. The results were tabulated in the following table.

| Time | untreated | 15 min | 30 min | 1 hr | 1.5 hr | 2 hr | 3 hr | 4 hr |
|---|---|---|---|---|---|---|---|---|
| | | | | Reaction Time | | | | |
| | | | | Viscosity (cps) | | | | |
| at 100 rpm | | | | | | | | |
| 2 min | 13.2 | 21.3 | 24.6 | 24.6 | 23.7 | 21.6 | 21.3 | 22.2 |
| 3 | 18.0 | 27.0 | 35.1 | 32.4 | 30.3 | 29.1 | 29.1 | 29.7 |
| 5 | 24.3 | 38.4 | 45.6 | 43.8 | 42.9 | 40.8 | 40.8 | 41.7 |
| 6 | — | 42.3 | 49.2 | 47.4 | 46.5 | 45.0 | 44.7 | 45.3 |
| 10 | 37.8 | 50.4 | 57.6 | 54.0 | 56.7 | 51.6 | 53.4 | 54.6 |
| 30 | 50.7 | 63.3 | 66.0 | 66.3 | 68.1 | 64.5 | 63.3 | 66.6 |
| 60 | 54.9 | 69.3 | 73.8 | 75.3 | 78.3 | 73.8 | 70.5 | 75.3 |
| 24 hr | 50.7 | 80.4 | 81.9 | 83.7 | 84.3 | 82.8 | 79.8 | 83.7 |
| at 300 rpm | | | | | | | | |
| 2 min | 11.0 | 13.5 | 15.8 | 14.8 | 14.4 | 13.7 | 13.5 | 13.9 |
| 3 | 13.0 | 16.4 | 23.3 | 19.6 | 18.3 | 17.4 | 16.9 | 17.7 |
| 5 | 16.9 | 23.1 | 28.2 | 27.2 | 26.7 | 25.8 | 25.9 | 26.2 |
| 6 | — | 25.8 | 29.5 | 28.7 | 28.6 | 27.9 | 27.8 | 28.2 |
| 10 | 22.8 | 29.4 | 32.5 | 31.4 | 32.3 | 30.5 | 31.3 | 32.0 |
| 30 | 28.2 | 35.6 | 35.7 | 35.5 | 36.2 | 35.7 | 35.6 | 36.5 |
| 60 | 30.4 | 36.0 | 37.9 | 38.1 | 39.1 | 38.4 | 37.2 | 38.5 |
| 24 hr | 29.5 | 39.2 | 40.5 | 41.0 | 41.4 | 41.0 | 40.2 | 41.5 |
| % N | 0.73 | 0.30 | 0.18 | 0.15 | 0.12 | 0.10 | 0.10 | 0.11 |
| % RAB | 6.0 | 5.2 | 4.2 | 3.7 | 3.6 | 3.4 | 2.9 | 2.7 |

It has been calculated that about an 18% increment of the untreated gum is needed to match the 24 hr. viscosity of the alkaline refined gums. Of course, an 18% increment of untreated gum would match the viscosity of the alkaline refined gum but would also increase the total RAB.

EXAMPLE II

Guar splits, 70 g (6.6% moisture), were first tempered with a dilute alkaline borax solution, 2.6 g NaOH and 0.15 g borax in 50 ml nitrogen purged water, for 30 min at room temperature, followed by 240 g of deaerated 30 wt % NaOH solution. The mixture was kept at 45° C. under nitrogen for 3 hrs with constant stirring. At the end of the treatment, 500 ml water was added and mixed for 10 min before centrifugation. The reacted splits were further washed with 700 ml water and partially neutralized to pH 9.0 with acetic acid. After separation the washed splits were milled and air dried to offer the product.

| Time | Viscosity at 100 rpm |
|---|---|
| 2 min | 21.0 |
| 3 | 30.0 |
| 5 | 39.0 |
| 10 | 54.6 |
| 30 | 64.8 |
| 60 | 69.6 |
| 24 hr | 75.0 |
| % N = 0.09 | % RAB = 2.3% |

EXAMPLE III

An alkaline borax solution was prepared by dissolving 5 g NaOH and 0.25 g borax in 237 g deaerated water. Guar splits, 109 g (8.6% moisture), were then added to it and tempered at room temperature for 30 min under nitrogen. The mixture was treated at 90° C. for 1 hr with constant stirring. The entire water phase was imbibed into the splits. The resulting mixture is 70.0% water.

The reacted splits were washed with 1.4 L 20° C. water for 30 min and neutralized to pH 9.5 with acetic acid. After centrifugation the splits were milled and air dried to give the product:

| Time | Viscosity at: | |
|---|---|---|
| | 100 rpm | 300 rpm |
| 2 min | 19.2 | 13.6 |
| 3 | 25.2 | 17.2 |
| 5 | 37.8 | 23.6 |
| 10 | 53.4 | 30.4 |
| 30 | 64.2 | 35.0 |
| 60 | 69.0 | 37.0 |
| 24 hr | 76.8 | 40.6 |
| % N = 0.15 | % RAB = 3.9 | |

Comparative Examples

EXAMPLE A

Guar splits, 109 g (8.6% moisture), were tempered with an alkaline borax solution, 2 g NaOH and 0.25 g borax in 115 g deaerated water, at room temperature for 30 min. This gave the splits 55% moisture. With constant stirring the mixture was treated at 90° C. for 1 hour under nitrogen. The reacted splits were then washed with 1.4 L 20° C. water for 30 min and neutralized to pH 9.5 with acetic acid. After separation by centrifugation the wet splits were milled and air dried to give the product:

| Time | Viscosity at: | |
|---|---|---|
| | 100 rpm | 300 rpm |
| 2 min | 14.4 | 12.0 |
| 3 | 20.4 | 14.0 |
| 5 | 28.8 | 19.2 |
| 10 | 43.8 | 26.0 |
| 30 | 54.0 | 30.4 |
| 60 | 58.8 | 32.2 |
| 24 hr | 63.0 | 34.4 |
| % N = 0.56 | % RAB = 8.2% | |

EXAMPLE B

Guar splits, 80 g (8.6% moisture), were tempered with a caustic solution, 0.73 g NaOH in 70 g deaerated water, at room temperature for 30 min to give 51% moisture. After thermal treatment at 90° C. for 30 min., the reacted splits were directly milled and air dried without further wash to give the product.

| Time | Viscosity at | |
|---|---|---|
| | 100 rpm | 300 rpm |
| 2 min | 7.8 | 7.4 |
| 3 | 9.6 | 8.6 |
| 5 | 13.2 | 10.6 |
| 10 | 18.0 | 13.2 |
| 30 | 24.6 | 16.0 |
| 60 | 28.2 | 18.0 |
| 24 hr | 37.2 | 22.2 |
| | % RAB = 10.4 | |

Comparative Examples A and B illustrate that when less than about 150 part by weight of aqueous alkali solution is used, the alkaline refined gum produced thereby possesses inferior solution viscosity and higher residue after break than the gum refined by process of this invention.

What is claimed is:

1. In a process of refining polygalactomannan by treating with an aqueous alkali solution, the improvement comprising: treating 100 parts by weight of polygalactomannan-containing gum splits with a minimum of 150 parts by weight of an aqueous alkali solution for a minimum of 15 minutes at a temperature in the range of from about room temperature to about 110° C., provided however, that the aqueous alkali solution is added in a sufficient amount whereby water is present in a minimum amount of 60% total weight.

2. The process of claim 1 wherein the gum splits, when treated with the aqueous alkaline solution are additionally treated with a polygalactomannan-complexing crosslinking salt which complexes with the polygalactomannan, thereby increasing its water insolubility.

3. The process of claim 2 wherein the complexing, crosslinking salt is selected from a group consisting of: ferric chloride, copper sulfate, copper acetate, lead acetate, aluminum levulinate, aluminum lactate, barium chloride, calcium chloride, sodium silicate, and borax.

4. The process of claim 3 wherein the gum splits are guar splits.

5. The process of claim 2 wherein the basic material is an alkali metal hydroxide.

6. The process of claim 5 wherein the alkali metal hydroxide is present in the aqueous solution in an amount of from 2% to 5%.

7. The process of claim 2 wherein from about 185 to about 600 parts by weight of the aqueous alkaline solution is employed per 100 parts by weight of gum splits.

8. The process of claim 2 wherein the crosslinking salt is borax.

9. The process of claim 7 wherein the temperature is maintained from about 70° C. to about 90° C. for from about 1 to 2 hours.

10. The process of claim 7 wherein nitrogen gas is employed to provide an inert atmosphere.

11. The process of claim 2 which further comprises collecting the suspended solids from the aqueous alkali solution, washing the suspended solids, neutralizing the wet solids to a pH of below about 11 with an acid, milling the neutralized solids, and drying the neutralized, milled solids.

12. Alkaline refined gum produced by the process of claim 2.

13. Alkaline refined gum produced by the process of claim 4.

14. Alkaline refined gum produced by the process of claim 11.

* * * * *